United States Patent [19]

Langer

[11] 3,755,074

[45] Aug. 28, 1973

[54] METHOD FOR SEPARATING PARTICLES

[75] Inventor: Sidney Langer, San Diego(La Jolla), Calif.

[73] Assignee: Gulf Oil Corporation, Pittsburgh, Pa.

[22] Filed: Apr. 25, 1968

[21] Appl. No.: 724,244

[52] U.S. Cl. ............... 176/16, 176/17, 176/91 SP, 23/324
[51] Int. Cl. .................. G21c 19/34, G21c 19/44
[58] Field of Search .................. 176/16, 91 SP, 17, 176/18; 23/324

[56] References Cited
UNITED STATES PATENTS

| | | | |
|---|---|---|---|
| 3,284,549 | 11/1966 | Ford et al. | 176/91 SP X |
| 3,293,135 | 12/1966 | Jaye et al. | 176/16 X |
| 3,312,597 | 4/1967 | Glueckauf | 176/91 X SP |
| 3,403,985 | 10/1968 | Knacke et al. | 23/324 |
| 3,453,091 | 7/1969 | Knotik et al. | 23/324 |
| 3,166,614 | 1/1965 | Taylor | 176/91 SP UX |

OTHER PUBLICATIONS

J. of Nuclear Materials, Vol. 11, No. 1, 1964, Dayton et al., pp. 1–12.

Nucleonics, Vol. 18, No. 1, Jan. 1960, pp. 86–90.

Primary Examiner—Carl D. Quarforth
Assistant Examiner—Harvey E. Behrend
Attorney—Anderson, Luedeka, Fitch, Even and Tabin

[57] ABSTRACT

A method for fueling nuclear reactors and thereafter separating groups of irradiated fuel prior to reprocessing of the groups. The method includes forming at least two groups of nuclear fuel particles. At least one of the groups is then coated with pyrocarbon while the remaining groups of particles are coated with material which includes a layer of silicon carbide. The coated groups of particles are then mixed with graphite and a graphite matrix fuel body is formed. A nuclear reactor is fueled with the fuel body and the fuel body is removed from the reactor after being irradiated. The fuel body is then exposed to oxidizing conditions sufficient to oxidize the graphite matrix and the pyrocarbon coating of one group without oxidizing the silicon carbide layer of the other groups. The intact silicon carbide groups of particles are then separated from the other groups of particles for reprocessing apart from the other groups of particles.

7 Claims, No Drawings

METHOD FOR SEPARATING PARTICLES

This invention relates to nuclear reactors, and more particularly relates to particulate nuclear fuels for use in nuclear reactors.

Power-breeder and converter nuclear reactors are particularly desirable types of nuclear reactors. In these reactors, fissionable nuclear material is produced from fertile nuclear material simultaneously with the production of useful power from fissile nuclear material. Since fertile nuclear material is relatively inexpensive in comparison with fissionable nuclear material, such reactors are economically of great value.

For example, a thorium-uranium fuel cycle is promising for power-breeder reactor operation. Naturally occurring thorium is in the form of the isotope $Th^{232}$. This isotope is fertile, having a high tendency to capture a neutron and become $Th^{233}$. $Th^{233}$ decays by two successive beta particle emissions to become $U^{233}$. $U^{233}$ is fissionable, and is considered excellently suited for use as fuel in a nuclear reactor.

In a power reactor wherein uranium is used as the fissionable material, the energy produced in the reactor usually comes principally from the fission of atoms of $U^{233}$. However, because $U^{233}$ is not available naturally, at least a part of the fissionable portion of the initial reactor charge is provided by a naturally occurring fissionable element, such as $U^{235}$. Also, in the initial reactor charge, it is sometimes considered desirable to maintain the fissionable nuclear material and the fertile nuclear material in a segregated state. Such segregation is considered to aid in facilitating recovery of the fertile nuclear material which has been converted to fissionable nuclear material after operation of a breeding cycle.

There are also advantages in employing the fertile and fissionable nuclear fuels in particulate form, having particle sizes generally less than about 5 millimeters in diameter. Particulate fuels can be individually coated with fission product retentive coatings which will significantly reduce the escape of such fission products that would otherwise contaminate the reactor coolant stream.

Moreover, when fissionable and fertile nuclear fuel materials are employed in a nuclear reactor, it is usually advantageous to be able to chemically reprocess each group of nuclear fuels separately after the nuclear fuels are removed from the reactor. Particulate nuclear fuels which function adequately within an operating nuclear reactor and which facilitate separation between different groups of nuclear fuels during reprocessing are desirable because heavy nuclides produced by capture of neutrons by the fissionable nuclear material become an increasingly greater problem as the power cycle progresses.

Accordingly, it is an object of the present invention to provide improved fuel systems for nuclear reactors. Another object of the invention is to provide particulate groups of nuclear fuels of different fissile and fertile materials which facilitate separation therebetween during reprocessing. A further object of the invention is to provide improved nuclear fuel systems utilizing different groups of fissile and fertile material wherein each group has excellent fission product retention during reactor operation and wherein each group also facilitates separation therebetween for reprocessing.

These and other objects of the invention will become more apparent from a reading of the following detailed description and the specific examples included therein.

Very generally, there is provided a nuclear reactor including at least two different groups of nuclear fuel material in particulate form, each group of which contains fissile or fertile material. Each particle in each of these groups also has a surrounding coating designed to retain fission products therewithin. The coating of at least one of said groups includes at least one continuous layer of silicon carbide. The coatings of at least one of the other groups contain at least one continuous layer of pyrocarbon, which is less resistant to oxidation than silicon carbide. The group having the pyrocarbon coating does not contain a layer of any material which has an oxidation resistance greater than the pyrocarbon coating. During the operation of the nuclear reactor, the silicon carbide and pyrocarbon coatings enhance fission product retention within the particles. At the end of the reactor lifetime of the groups of fuel particles oxidation is employed to aid in separating the group of silicon carbide coated particles from the group coated with pyrocarbon.

The relative sizes of the particles of the nuclear fuel materials which are coated are generally determined in respect to the particular application for which they are to be employed. Any suitable particle size may be employed for purposes of the present invention, although in most instances the particle sizes of the nuclear fuel to be coated will range between about 100 and 1000 microns.

Likewise, the nuclear fuel materials may be any of the well-known fissile or fertile nuclides, such as thorium, uranium and plutonium. Moreover, the individual particles may include more than one material; for example, mixtures of uranium and thorium or mixtures of uranium and plutonium are often employed within a single particle. The nuclear material, whether fissile or fertile, is preferably used in the form of compounds, such as carbides, oxides, nitrides or silicides.

For purposes of the present application, the term "fertile particles" will be used in reference to those particles which are used during the reactor cycle for both breeding and power generation purposes. The term "fissile particles" will be used with reference to those particles which are used primarily during the reactor cycle for power generation. It should be recognized, however, that the fertile particles may contain some fissile material and that the fissile particles may contain fertile material. It is usually desirable to dilute the fissile material or fissile particles with a material which limits the burnup of the particles and which provides a negative temperature coefficient of reactivity. For example, when uranium is used as the fissile material in the fissile particles it is often diluted with thorium at mole ratios of up to about 5:1 of thorium to uranium.

It is, however, usually considered desirable to provide only fertile nuclear material in the fertile particles. The inclusion of naturally occurring fissionable material, i.e., $U^{235}$, in the fuel system results in the production of undesirable uranium isotopes at a level such that those particles which initially contain the $U^{235}$ must later be separated from the fertile particles before chemical processing. If the fertile particles initially contain only thorium, the fertile particles will produce $U^{233}$ at a Th:u ratio of about 30:1 at the end of a 6 year core life. However, for certain reactor loading concepts, fissile material may be included in the fertile particles.

Specifically, this invention provides a nuclear fueling system for reactors in which bred $U^{233}$ can be separated before dissolution from the remaining $U^{235}$. This enables separation of the remaining $U^{235}$ and the $U^{236}$ created by neutron capture in the initial $U^{235}$ from being carried into the recycled fuel along with the $U^{233}$.

It has been found desirable to segregate the fertile particles from the fissile particles at the end of the reactor core lifetime Such segregation permits relatively easy recovery of the bred fissile material, usually $U^{233}$, which is bred in the fertile particles. The fissile particles which, after cycling through the reactor core, contain a relatively large proportion of undesirable nuclides, such as $U^{236}$, may then be disposed of, or reprocessed by separate techniques.

Nuclear fuel materials expand during high temperature operation of a nuclear reactor and create gaseous fission products. Provision is made in the present invention to accommodate these expansion effects. If a dense nuclear fuel material is employed as the core of the particle, it is usually considered desirable to use a low density coating immediately adjacent the outer surface of a fuel material core to provide expansion accommodation at a location interior of the more dimensionally stable outer silicon carbide or pyrocarbon coat. It should be understood that additional layers of suitable coating may be deposited exterior of the silicon carbide jacket, or intermediate the silicon carbide or pyrocarbon jacket and the core material.

When a low density layer of material is employed adjacent the particle core, it is preferred to use a spongy carbon material, such as that more particularly set forth in U.S. Pat. No. 3,325,363. Spongy carbon is defined as a soot-like amorphous carbon which has a diffuse X-ray refraction, and which has a density of less than half the theoretical density of carbon. The primary function of such a spongy layer is to attenuate fission recoils and a secondary function is to accommodate stresses resulting from differential expansion of the nuclear fuel core material and the dense silicon carbide or pyrocarbon layer. Generally, the thickness of such spongy carbon layer will be at least 20 microns and preferably at least about 25 microns.

The silicon carbide layer for one group of particles might, for example, be employed exterior of a two-layer coated particle such as that disclosed in U.S. Pat. No. 3,298,921, wherein an interior coating of spongy carbon is surrounded by a jacket of dense isotropic pyrolytic carbon. The other group of particles might then be coated in a similar fashion to provide an interior coating of spongy carbon and an exterior coating or jacket of dense isotropic pyrolitic carbon. The silicon carbide jacket exterior of the two layer spongy carbon and pyrocarbon coatings would provide additional fission product retention in addition to protecting the inner carbon coatings when oxidation is used to remove the carbon coatings from the other group of core material.

It should be understood that attitional layers of protective material, such as additional layers of pyrolytic carbon, may be employed exterior of the silicon carbide layer to insure stability during neutron irradiation.

Generally, in the invention, a continuous layer of silicon carbide between about 5 microns to about 25 microns is applied to one of the group of particles. Preferably, a coating at least about 10 microns thick is deposited. A coating thicker than about 25 microns of silicon carbide might be used if large particles are used or were it to be employed as the only barrier to fission product migration. It should also be realized that a thinner layer of silicon carbide could be employed in the present invention for the purpose of merely facilitating separation of the two groups of particles wherein the silicon carbide layer is not relied upon as a significant fission product barrier. However, the dual purpose of the silicon carbide as a fission product barrier, and for facilitating separation of the two groups of particles is generally achieved by the use of silicon carbide coatings in the above-defined thickness range. Even thicker layers of silicon carbide may be employed for fuel particles of relatively large size, i.e., larger than about 500 microns.

Although the thickness of the individual components of composite coatings may vary within the ranges mentioned heretofore, the total thickness of the composite coating will usually be equal to at least about 25 percent of the size of the nuclear fuel core material of the particle, in order to provide the desired fission product retention and suitable particle strength.

The silicon carbide may be applied in any suitable manner which will give the desired density. The silicon carbide should usually be at least about 90 percent of the theoretical maximum density of silicon carbide to provide the desired fission product retention within the thickness range described above. Small particles of nuclear fuel material can be conveniently coated by deposition from a vaporous atmosphere, as in a fluidized bed coating apparatus which is described in more detail in U.S. Pat. No. 3,298,921. However, other known methods of coating may also be employed which will provide continuous coatings of the desired density and thickness. When deposition from a vaporous atmosphere is used, the silicon carbide may be directly deposited from a mixture of hydrogen and methyltrichlorosilane.

As previously indicated, the pyrocarbon outer jacket of the other group of particles may be deposited from a vaporous atmosphere as described in detail in U.S. Pat. No. 3,298,921. As in the case of the silicon carbide jacket, the pyrocarbon coating should be capable of deposition with sufficient density and thickness to provide the desired fission product retention. The pyrocarbon outer layer can be deposited by any suitable method, such as from a mixture of an inert gas and a hydrocarbon at a suitable temperature. For example, a fluidized bed of spongy carboncoated particles may be coated at a temperature of 2,000°C by methane in a flow of helium gas. Other suitable coating methods may also be used which provide the desired density.

As previously indicated, the primary object of the invention is the separation of the two groups of particles by oxidation prior to actual chemical reprocessing to recover useful nuclear fuel material. The objective of the primary separation process by oxidation is to reduce the pyrocarbon coated group of particles to an ash or to a sufficiently small particle size that the remaining silicon carbide-coated group of particles can be separated by physical means therefrom, using a suitable separation method, such as simple mechanical screening. The particular chemical reprocessing operation to be used thereafter may well dictate which group of particles, i.e., the fertile group or the fissile group, will be coated with the silicon carbide.

As previously indicated, the nuclear fuel material used for the core of both the fissile and fertile particles may be in the form of a compound, such as oxides, carbides, nitrides or silicides. In this connection, the chemical form of the core of the silicon carbide coated group of fuel particles is relatively immaterial for the separation scheme of the invention, since the silicon carbide coating protects the core from oxidation during burning after unloading the groups from a reactor. However, the form of the nuclear material in the pyrocarbon coated particles may determine the separation process to be used after oxidation of the pyrocarbon coating. The carbide and nitride forms of nuclear fuel materials are readily oxidized and would presumably oxidize to a fine ash after burnup of the pyrocarbon coating. The silicon carbide coated group of particles could then be separated by crude screening. The oxide form of nuclear fuel materials may be more stable. The oxide form of the fuel materials might remain intact during burnup of the pyrocarbon coating. For this embodiment of the invention, i.e., when an oxide compound is used as the core material, the separation of the separate groups of fuel particles would be based on physical processes dependent on the differentially sized fuel particles or on selective dissolution.

When separation processes are based on differential sizes of the groups of fuel particles after oxidation has been used to remove the pyrocarbon coating of one group it is preferred that the smaller group of particles be at least less than about 70 percent of the diameter of the larger group of particles. It is generally more convenient to make the silicon carbide coated group of particles the smaller size.

For ease of separation after oxidation of the pyrocarbon coated group of fuel particles, it is preferred to use an oxidizable nuclear fuel compound as the nuclear fuel core of this group of particles. However, it should be understood that for fuel loading programs wherein an oxidizable form of nuclear fuel material is not desirable in the pyrocarbon coated group of materials that physical separation schemes may readily be based on providing particles with nuclear fuel cores of different diameter than the silicon carbide coated group of particles.

Also, in this connection, since it may be desirable to only process and recover the fissile nuclear fuel generated in the fertile particles, it is generally desirable that the fertile particles be coated with the pyrocarbon material. Thereafter, when the two groups of particles are burned in an oxidizing atmosphere, the nuclear material in the fertile particles is obtained as a fine ash which is more easily processed by chemical means after the silicon carbide coated fuel particles are separated therefrom by screening.

The oxidation of the particles may be carried out in any suitable manner under suitably controlled conditions. Generally, application of air under sufficiently high temperature in a suitable apparatus, for example, a fluidized bed reaction apparatus, can be used. Because it is likely that some of the nuclear materials will be carried out of such apparatus by the air stream during oxidation, the apparatus used should be designed to take this into consideration. The oxidation may be carried out in air temperatures not greater than about 1200°C and preferably at about 1000°C or below so that there is no substantial effect upon the silicon carbide coatings. Moreover, these temperatures can be reduced if oxygen is used instead of air.

After the pyrocarbon is removed by oxidation of that group of particles coated with pyrocarbon and suitable physical separation is performed, known chemical processes are used as required to individually reprocess the silicon carbide-coated particles and the other group of particles which may then be in the form of ash or in the form of uncoated nuclear fuel oxide cores.

The fissile and fertile particles may have been combined with a suitable oxidizable matrix material, such as graphite, and formed into a matrix fuel body prior to loading into a nuclear reactor. At the end of the core lifetime the oxidizable material is oxidized along with the pyrocarbon coating of one of the groups of particles.

The following examples illustrate several processes suitable for producing coated groups of particles and processes for the ultimate separability of such groups by oxidation thereof. While these examples include the best modes presently contemplated by the inventors for carrying out the invention, it should be understood that these examples are only illustrative and do not constitute limitations upon the invention which is defined solely by the claims which appear at the end of the specification.

EXAMPLE I

Particulate uranium dicarbide is prepared having a particle size of about 300 microns and being generally spheroidal in shape. The uranium used contains about 93 percent $U^{235}$ enrichment. A graphite reaction tube having an internal diameter of about 2.5 centimeters is heated to about 1100°C while a flow of helium gas is maintained through the tube. When coating is ready to begin, the helium flow rate is increased to about 1000 cc. per minute, and a charge of 50 grams of the spheroids of uranium dicarbide is fed into the top of the reaction tube. The flow of gas upward through the tube is sufficient to levitate the spheroids and thus create within the tube a fluidized particle bed.

When the temperature of the spheroids reaches about 1100°C, acetylene gas is admixed with the helium, the flow rate of which is adjusted, to provide an upwardly flowing gas stream of the same total flow rate but having a partial pressure of acetylene of about 0.80 (total pressure 1 atm.). The acetylene gas decomposes and deposits low density, spongy carbon upon the nuclear fuel spheroids. Under these coating conditions, the coating deposition rate is about 15 microns per minute. Flow of the acetylene is continued until a low density, spongy, pyrolytic carbon coating about 25 microns thick is deposited upon the nuclear fuel spheroids. Then, the acetylene gas flow is terminated and the coated spheroids are maintained in a fluidized condition in a flow of helium.

The temperature of the reaction tube is raised to about 1500°C, and hydrogen is substituted as the fluidizing gas. Approximately 10 percent of the hydrogen stream is bubbled through methyltrichlorosilane. Under these conditions, silicon carbide is deposited upon the outer surfaces of the carbon-coated spheroids until each is uniformly coated with a layer about 30 microns thick. Examination and measurement shows that the density of the silicon carbide is about 99 percent of theoretical density. Exterior of the SiC coat is further deposited a coat of isotropic pyrolytic carbon by the method described in Example II following.

Testing of the coated particles is carried out by disposing them in suitable capsule and subjecting them to neutron irradiation at an average temperature of about 1250°C for about 3 months. During this time, the total fast-flux exposure is estimated to be about $2.4 \times 10^{21}$ neutrons per square centimeter (using neutrons of energy greater than about 0.18 Mev.).

After burnup of about 10 percent of the fissile atoms, no coating failures are apparent. The fission product retention of these particles is considered excellent, being well within the acceptable limits.

EXAMPLE II

A 50-gram charge of thorium-uranium dioxide shperoids having a particle size of about 200 microns is prepared having a thorium to uranium mole ratio of about 4 to 1. These spheroids are coated with a 25-micron thick layer of low density, spongy pyrolytic carbon in the same manner as set forth in Example I.

The coated charge is then transferred to a slightly larger reaction tube having an internal diameter of about 3.8 centimeters. This tube is heated to about 2000°C while a flow of helium gas of about 7,000 cc. per minute is passed therethrough. When the tube reaches the desired temperature, the spongy carbon-coated charge of spheroids, which now have diameters of about 250 microns, are fed into the reaction tube to provide a bed surface area of about 1000 cm². When the temperature of the coated spheroids reaches 2000°C, methane gas is admixed with the helium to provide the upflowing gas stream with a methane partial pressure of about 0.15 (total pressure 1 atm.), the total flow rate of gas remaining at about 7,000 cc. per minute. The methane decomposes to deposit a dense isotropic pyrolytic carbon coating over the spongy carbon coating. Under these coating conditions, the carbon deposition rate is about one-third micron to 1 micron per minute. The methane gas flow is continued until an isotropic pyrolytic carbon coating about 85 microns thick is obtained. At this time the methane gas flow is terminated, and the coated fuel particles are cooled fairly slowly in helium and then removed from the reaction tube.

The coated particles are examined and tested. The density of the isotropic carbon outer layer measures about 2.0 grams per cc. The Bacon Anisotropy Factor is about 1.1. The apparent crystallite size of the outer layer is about 140 A.

After high temperature irradiation under the conditions as set forth in Example I, there are no coating failures and the particles are considered well suited for high temperature nuclear reactor use.

EXAMPLE III

Equal parts of about 10 grams each of the particles resulting from Examples I and II are mixed together after they are tested via irradiation. This mixture is dispersed in a fluidized bed furnace containing a charge of 30 grams of alumina particles and through which a supply of air is passed. The furnace is heated to about 700°C while the particles are kept in motion. Treatment under these conditions is carried out for about 60 minutes. At the end of this time, the supply of air is halted and the particles are cooled and removed from the furnace. Examination shows that the silicon carbide-coated particles remain intact while the pyrocarbon coatings of the other group of particles are missing as a result of oxidation, leaving the thorium-uranium dioxide spheroids uncovered. Separation of the larger silicon carbide particles can easily be made from the exposed particles via screening.

EXAMPLE IV

A 50-gram charge of thorium-uranium dicarbide spheroids having particle sizes in the range from about 100 microns to 400 microns is prepared having a thorium to uranium mole ratio of about 4.25 to 1. These spheroids are coated with a 25-micron thick layer of low density, spongy pyrolytic carbon in the same manner as set forth in Example I. Next, the spheroids are coated with a second layer of dense isotropic carbon using the same coating conditions as specified in Example II. Coating is continued at these conditions until about an 80-micron thick coating of pyrolytic carbon is obtained.

These particles are irradiated under the conditions set forth in Example I. After a burnup of about 10 percent of the fissile atoms, no coating failures are apparent. The fission product retention of these particles is considered excellent, being well within the acceptable limits.

EXAMPLE V

Equal parts of about five grams each of the particles resulting from Examples I and IV are mixed together. After testing under neutron irradiation this mixture is disposed in the rotating bed furnace employed in Example III through which a supply of air is passed. The furnace is heated to about 700°C while the particles are kept in motion. Treatment under these conditions is carried out for about 1 hour. At the end of this time, the supply of air is halted, and the particles are cooled and removed from the furnace. Examination shows that the silicon carbide-coated particles remain intact while the pyrocarbon coatings plus the underlying spongy carbon coating of the uranium-thorium dicarbide particles are absent as a result of oxidation. Furthermore, the uranium-thorium carbide spheroids are now in the form of fine uranium and thorium-oxide powder as a result of oxidation thereof. Separation of the silicon carbide particles is easily made from the finely powdered ash of the other oxidized group of particles.

EXAMPLE VI

Equal parts of about five grams of each of the particles of Examples I and IV are mixed together. The mixture of irradiated particles is then mixed with 0.6 grams of graphite having a density of 2.0 gram/cc. The mixture is then injection molded into cylindrical bodies at room temperature to provide graphite matrix fuel bodies. The bodies are cured at 100°C and are then carbonized at 1000°C. After testing under neutron irradiation the fuel bodies are disposed in the fluidized bed furnace employed in Example III through which a supply of air is passed. The furnace is heated to about 700°C while the fuel body is kept in motion. Treatment under these conditions is carried out for about 1 hour. At the end of this time, the supply of air is halted, and the remaining particles are cooled and removed from the furnace. Examination shows that the silicon carbide-coated particles remain intact. The graphite matrix and the pyrocarbon coatings and the underlying spongy carbon coating of the uranium-thorium carbide particles are absent as a result of oxidation. Furthermore, the uranium-thorium carbide spheroids are now in the form of fine uranium and thorium-oxide powder as a result of oxidation thereof. Separation of the silicon carbide particles is easily made from the finely powdered ash of the other oxidized group of particles.

The invention provides a nuclear reactor fueling system which facilitates the individual reprocessing of different groups of nuclear fuel materials. The system might, for example, be advantageously employed in the nuclear reactor and method of refueling disclosed in U.S. Pat. No. 3,208,912 to Jaye et al., issued Sept. 28, 1965. Moreover, in one embodiment of the invention the reduction of the fertile material to a powder in the oxidation separation process may save a step in the reprocessing and have additional economic value from this standpoint.

Various of the features of the invention are set forth in the following claims.

It is claimed that:

1. A method for fueling nuclear reactors and treating the irradiated fuel therefrom prior to fuel reprocessing, which method comprises forming at least two groups of nuclear fuel particles, one of said groups containing fissile material, the other of said groups containing fertile material, coating the particles of one of said groups with individual coatings of pyrocarbon to contain fission products therewithin and coating the particles of the other of said groups with individual coatings of dense silicon carbide to contain fission products therewithin, fueling a nuclear reactor with particles from both of said groups, removing irradiated fuel from said nuclear reactor, exposing said removed fuel to an oxygen containing gaseous atmosphere at a temperature of from about 700°C to about 1200°C so as to oxidize said pyrocarbon coatings of said one group of particles and provide particle remains and separating said group of particles coated with said silicon carbide to allow reprocessing thereof apart from said other group of particles, said silicon carbide coated particles having an average diameter of at least 70 percent larger than the average diameter of said remains of said other group of fuel particles.

2. A method in accordance with claim 1 wherein said particles from both of said groups are formed with graphite into a nuclear fuel body in which said particles are disposed in a graphite matrix, and wherein said graphite matrix is oxidized along with said pyrocarbon coatings after removal from said reactor.

3. The method in accordance with claim 1 wherein said silicon carbide layer is at least about 10 microns thick.

4. The method in accordance with claim 3 wherein said silicon carbide layer has a density at least equal to about 90 percent of theoretical density.

5. The method in accordance with claim 1 wherein said nuclear fuel in said group of particles coated with said pyrocarbon is in a form whereby it is oxidized to a powdered state when said pyrocarbon coatings are oxidized.

6. The method in accordance with claim 5 wherein said nuclear fuel in said group of particles coated with pyrocarbon is in carbide form.

7. The method in accordance with claim 1 wherein said silicon carbide-coated particles are substantially larger than the remains of said other group of fuel particles after oxidation of said pyrocarbon coating.

* * * * *